(12) United States Patent
Udov et al.

(10) Patent No.: US 12,342,816 B2
(45) Date of Patent: Jul. 1, 2025

(54) COMPOSITION FOR FERTILIZATION AND TREATING TREES, SHRUBS AND CLIMBING PLANTS WITH PROGRAMMED RELEASE OF THE ACTIVE SUBSTANCE THAT AT THE INJECTION LOCATION INDUCES FORMATION OF A CLUMP OF YOUNG ROOTS THAT BECOME THE MOUTH OF THE TREE

(71) Applicant: HERBAFARM-MAGNOLIJA D.O.O., Zagreb (HR)

(72) Inventors: Maks Udov, Velika Gorica (HR); Tin Udovč, Velika Gorica (HR)

(73) Assignee: HERBAFARM-MAGNOLIJA D.O.O., Zagreb (HR)

( * ) Notice: Subject to any disclaimer, the term of this patent is extended or adjusted under 35 U.S.C. 154(b) by 465 days.

(21) Appl. No.: 17/775,697

(22) PCT Filed: Mar. 20, 2020

(86) PCT No.: PCT/HR2020/000003
§ 371 (c)(1),
(2) Date: May 10, 2022

(87) PCT Pub. No.: WO2021/094794
PCT Pub. Date: May 20, 2021

(65) Prior Publication Data
US 2023/0354805 A1   Nov. 9, 2023

(30) Foreign Application Priority Data

Nov. 11, 2019 (HR) ............................... P20192037A

(51) Int. Cl.
| | |
|---|---|
| *A01N 25/28* | (2006.01) |
| *A01N 25/34* | (2006.01) |
| *A01N 43/40* | (2006.01) |
| *A01N 63/12* | (2020.01) |
| *C05D 5/00* | (2006.01) |
| *C05D 9/00* | (2006.01) |
| *C05D 9/02* | (2006.01) |
| *C05G 1/00* | (2006.01) |
| *C05G 3/40* | (2020.01) |
| *C05G 3/80* | (2020.01) |

(52) U.S. Cl.
CPC ............. *A01N 25/28* (2013.01); *A01N 25/34* (2013.01); *A01N 43/40* (2013.01); *A01N 63/12* (2020.01); *C05D 5/00* (2013.01); *C05D 9/00* (2013.01); *C05D 9/02* (2013.01); *C05G 1/00* (2013.01); *C05G 3/40* (2020.02); *C05G 3/80* (2020.02); *B65D 2203/10* (2013.01)

(58) Field of Classification Search
None
See application file for complete search history.

(56) References Cited

U.S. PATENT DOCUMENTS

| | | | |
|---|---|---|---|
| 5,741,346 A * | 4/1998 | Glover | ..................... C05D 9/00 71/21 |
| 5,859,024 A | 1/1999 | Hotson et al. | |
| 8,759,254 B2 | 6/2014 | Picanco et al. | |
| 2007/0167327 A1 | 7/2007 | Savich | |
| 2017/0275212 A1 | 9/2017 | Forte et al. | |
| 2021/0300837 A1* | 9/2021 | Blanchard | ................ C05G 5/45 |

FOREIGN PATENT DOCUMENTS

| | | |
|---|---|---|
| CN | 104030839 A | 9/2014 |
| CN | 108271489 A | 7/2018 |
| CN | 109197320 A | 1/2019 |
| EP | 0901490 A1 | 3/1999 |
| HR | P20140358 A2 | 10/2015 |
| JP | H02238817 A | 9/1990 |
| WO | 2009137434 A2 | 11/2009 |
| WO | 2012074557 A1 | 6/2012 |
| WO | 2015159110 A1 | 10/2015 |

OTHER PUBLICATIONS

Machine translation of JP H04221123-A (Aug. 11, 1992).*
Machine translation of JP 2008-228574 (Oct. 2, 2008).*
International Search Report issued in International Application No. PCT/HR2020/000003 mailed on Jul. 16, 2020.
Written Opinion issued in International Application No. PCT/HR2020/000003 mailed on Jul. 16, 2020.

* cited by examiner

*Primary Examiner* — John Pak
(74) *Attorney, Agent, or Firm* — ROSSI, KIMMS & McDOWELL LLP

(57) ABSTRACT

The disclosed composition for fertilization and treating trees, shrubs and climbing plants with programmed release of the active substance is comprising the active substance stored in capsules made by nanoencapsulation or microencapsulation method and wherein based on capsule membrane the time of release of the active substance is adjusted. The active component stored in the nanocapsules or microcapsules can be such that it acidifies the surrounding soil in the range of pH 2.5 to pH 6.5. One example of such active component is the use of citric acid, which is completely ecological and does not create environmental pollution. Also, the active component in the nanocapsules can be such that it regulates the acidity of the soil in the range of pH 6.5 to pH 7.0. Furthermore, the active component in the special capsules can be an insecticide and/or in the special capsules fungicide, and/or in the special capsules acaricide and/or in the special capsules pheromone and/or in the special capsules repellent.

14 Claims, No Drawings

COMPOSITION FOR FERTILIZATION AND TREATING TREES, SHRUBS AND CLIMBING PLANTS WITH PROGRAMMED RELEASE OF THE ACTIVE SUBSTANCE THAT AT THE INJECTION LOCATION INDUCES FORMATION OF A CLUMP OF YOUNG ROOTS THAT BECOME THE MOUTH OF THE TREE

THE TECHNICAL FIELD TO WITCH THE INVENTION RELATES

This invention relates to compositions for fertilization and treating trees, shrubs and climbing plants, respectively it relates to smart soil improvers and smart agents for treatment in which the activation time of the fertilization/treatment and the duration of such fertilization or treatment can be adjusted. This invention also relates to the specific incorporation of this composition into the root system of trees or shrubs and to the consequent appearance of a clump of young roots created at the location of incorporation of the composition, and which becomes the "mouth of the tree". These "mouth of the tree" become an important place through which to the plant can be "served", in a very small amount, some substance that the plant will intake almost 100% into the root system and absorb.

TECHNICAL PROBLEM

It is well known that the application of fertilizers respectively agents for fertilization, such as nitrogen, effects on increase of yields, but in most cases the problem is fast transformation of the active component into the passive component, respectively flushing from the root zone. Depending on the conditions in soil, added active substances can get lost from the alkaline soils in gaseous form and in acid soils in the case of use nitrogen fertilizers, nitrates are transforming to gaseous nitrogen. The same problem is present with the application of insecticides, pesticides and insect repellents that are through the root carried into the plant.

Usually, nowadays the treatment of plants works so that the leaves are dusted multiple times or the active substance is carried into the ground either as fertilizer or as an insecticide respectively fungicide, or any other agro technically active substance that helps and increases the growth and development of the plant and/or protects it from parasites and insects. Every intake of active substance into the soil (or on the soil) requires significant costs, and the aim of this invention is to reduce these costs too.

It is the aim of this invention to create a "mouth of the tree" that will absorb said embedded components. MOUTH OF A TREE is a clump of young roots that arise at the location of incorporation of the bag filled with the composition within a year, weighing 2-5 kg. This clump of young roots has a great power to absorb nutritive substances, so there is no need to unnecessarily disperse them on the surface around the tree, but only intake them in that clump which will absorb them almost 100%.

Furthermore, it is the aim of this invention to reduce the unnecessary load of soil with active chemical substances which plants are not able to utilize at the time when these active substances are carried into the soil.

Furthermore, it is the aim of the invention to find fertilizer that can slowly or rapidly release substances depending on external factors such as the influence of changes in soil pH, moisture, root excretion or temperature.

The inventor had a goal to develop a composition for fertilization and treating trees, shrubs and climbing plants with programmed release of the active substance so that the activation of fertilization/treating time and duration of such fertilization or treating can be adjusted.

STATE OF THE ART

The inventor has previously invented and patented an invention called Composition for organic-inorganic fertilization and biological rehabilitation of trees, shrubs and climbing plants, package for the composition and process for using thereof, protected by patent PK20140358 valid in the Republic of Croatia.

This patent does not resolve the question of programmed input of the active component (fertilizer, insecticide, fungicide, repellents or any other active substance) into the plant system. This invention can be combined with the present invention. With that patent was not resolved the creation of a "mouth of a tree" because that is newly discovered during the application of an earlier patent. It is unknown to the inventor if anywhere in the world is protected composition for fertilization and treating trees, shrubs and climbing plants with programmed release of the active substance disclosed in this invention, nor the term "mouth of a tree" which signifies the new appearance of the creating a larger clump of young roots at the point of application of a patented composition.

Based on searches in patent databases PATENTOSCOPE, USPTO Patent Database, and ESPACENET, it has not been found similar existing patents or patent applications.

A BRIEF SUMMARY OF THE INVENTION

The inventors have conducted multiannual research about application of composition for fertilization and treating trees, shrubs and climbing plants with programmed release of the active substance. They tried different ways how to achieve that the activation of the active substance can be controlled depending on the time of deposition into the soil, and also to control, once the active substance is activated, the time it takes to release the active substance.

Based on those activities, experimentations and observation, smart fertilizer with prolonged effect has been developed, respectively composition for fertilization and treating trees through the root system so that the action last during most of vegetation time, or even longer. It is about that, that the active substances which are in form of granules, are sheathed with a layer that does not allow the fertilizer or the active substance of the chemical agent to pass quickly into the soil. With such slow release of nutrients and active chemical substances from the granule, the efficiency of the plant composition and treatment increases in average from 50 to 300%.

This invention is based on inventors new understanding which the inventor has obtained by monitoring and testing after the appliance of the primary invention called Composition for organic-inorganic fertilization and biological rehabilitation of trees, shrubs and climbing plants, package for the composition and process for using thereof, protected by patent PK20140358 valid in the Republic of Croatia. The new knowledge was observed and confirmed after the excavation of a number of biodegradable bags that have been in the soil for more than a year. During that period, on that location of entry into soil was created an accumulation of young roots in shape od soccer ball with a diameter of 35 cm and weighing approximately 5 kg, filled with a large number of intertwined tiny young roots, and which can absorb virtually all the active components that are entered into it. That ball actually represents the MOUTH OF A TREE, because at a very narrow location the plant absorbs all the substances introduced through the young roots, so that it can purposeful and with very few spent active components, practically without flushing into deeper soil layers and ground waters pollution, be performed the treatment on the tree i.e. the plant.

Furthermore, this invention takes advantage of the observed increased resistance of the plant to pests and diseases. That increased resistance appeared after the treating the plant with biodegradable bag, which is caused by entering the useful nematodes which are part of the biodegradable bag into the root system of the treated tree.

The disclosed composition comprises nanoparticles with diameter of 1-100 nm, but may also comprise micro particles size up to part of a millimetre, that is, granules for controlled release of macro and microelements, so that a controlled and even release of nutrients into the soil is achieved, and that means less soil load with fertilizers and active chemical compounds. In the case there are capsules in which fertilizers or the active components are stored, any method of nanoencapsulation or microencapsulation is used, wherein the active components are sheathed with a thin protective film. For easier use and manipulation with those capsules, they can be comprised in an emulsion or in a paste or gel.

The disclosed nano- or microformulation of the pesticides is a slow and targeted, thus programmed release of the active substance enabled, and that is how is possible to achieve a greater effect with a lower dose of chemicals. Furthermore, with nano-encapsulation pheromones as well as repellents can be stored in the nanogel, and it has proven to be very effective when it is used in fruit production because they reduce the unwanted pest population. Namely, pheromones secreted through the leaves of the fruit confuse the insects during their mating period, which leads to a decrease in the production of the next generation of pest, considering that is targeted a specific insect species at a specific mating period. Thus, by separate nanoencapsulation of different types of pheromones, depending on the time and duration of mating specific insect species, it is achieved that with one appliance the effect is ensured, both temporally in duration and in the "programming" the beginning of activity of the active component of the pheromone.

Repellents are used to treat park trees, shrubs and climbing plants because with them is not necessary to look after the taste and smell of the plant because they are not for human consumption.

Although the cost of production of the disclosed smart nano-fertilizer or composition for fertilization and treating plants is higher than the cost of production of conventional fertilizers and preparations, this cost is compensated multiple times by reducing required dosage and the environmental benefits realized because of lower active substance losses.

The disclosed composition for fertilization and treating trees, shrubs and climbing plants with programmed release of the active substance is comprising the active substance stored in capsules made by nanoencapsulation or microencapsulation method and wherein based on capsule membrane the time of release of the active substance is adjusted. The active component stored in the nanocapsules or microcapsules may be such that it acidifies the surrounding soil in the range of pH 2.5 to pH 6.8. One example of such active component is the use of citric acid, which is completely ecological and does not create environmental pollution.

Also, the active component in the nanocapsules may be such that it regulates the acidity of the soil in the range of pH 6.5 to pH 7.0 and so extend the active life of the insecticide, which depends on the acidity of the environment in which it is released. Furthermore, the active component in the special capsules can be an insecticide and/or in the special capsules fungicide, and/or in the special capsules acaricide and/or in the special capsules pheromone and/or repellent. In the case of active components that do not affect each other, then such active components can be stored together in a single nanocapsule. Any systemic insecticides, fungicides, acaricides, pheromones or repellents suitable for introduction into the plant via the root system, such as flonicamide, may be used as the active components.

The disclosed composition for fertilization and treating is filled into cylindrical biodegradable bags, and for future use and easier finding of the fertilization location there is an RFID transmitter or metal ring or other form of detection installed at the upper end of the bag which is used to identify the location of the bag with the composition when the soil is overgrown with grass. This is important, since in one to two years there will be intensive development of a large amount of young roots around the place where the biodegradable bag with the composition is placed (the shape of a soccer ball weighing approximately 5 kg) and trough the roots nutritious and active components (insecticides, fungicides, pheromones, repellents, etc.) will be added to the plant.

One mixture of composition for fertilization and treating plants is performed to comprise:
  expanded volcanic sand—perlite in the range of 2.00 to 3.00 mass percentage
  white peat in the range of 25.00 to 30.00 mass percentage
  stable dung processed by red Californian earthworms in the range of 15.00 to 20.00 mass percentage
  dehydrated horse dung in the range of 10.00 to 15.00 mass percentage
  ground natural volcanoes zeolite mineral in the range of 30.00 to 35.00 mass percentage
  slow-release mineral fertilizers with magnesium oxide and microelements in the range of 2.00 to 3.00 mass percentage
  mineral complex fertilizer based on nitrogen, phosphorus and potassium in the range of 2.00 to 3.00 mass percentage
  chemically active substance up to 1 mass percentage relative to the total weight of the composition, which is filled into cylindrical biodegradable bags upper end of which is closed by biodegradable ribbon. With this, the invention is not limited to other types of mixtures.

The process of using the composition is such that said composition is packed in cylindrical biodegradable bags and is vertically placed near the roots of the plant in a pre-made hole in the soil in a way that the upper end of the biodegradable bag is in the level with the terrain. Usually, the place where is the upper end of the biodegradable bag laid, is covered with mulch. In the case of new planting, the said composition packaged in biodegradable bags is placed in a vertical position, while the plant is planted, on the edge of the plant pit so that the upper end of the biodegradable bag is in the level with the terrain.

The ingredients of the disclosed composition is made up of nutrients, fertilizers, useful nematodes and active chemical substances (insecticides, fungicides, pheromones and repellents) and possibly other substances, all of which nourish the root of the plant, encourage it to grow healthy and better rooting, it creates a place for useful bacteria to live in, enables the exchange of gases in the substrate, and binds nutrients on itself, preventing them from flushing uncontrollably into deeper layers of soil, i.e. into underground watercourses.

Furthermore, chemically active substances which are released on a programmable way, with control over the time at which release occurs and how long the release lasts. The composition is packed in a biodegradable bag with a cylindrical shape, which height is 20 to 60 cm (usually 40 cm), diameter is 14 cm, so that it can be easily inserted into drilled hole with a 15 cm diameter and placed vertically into the ground. These cylindrical bags are placed in the soil as fallows; in the root zone of the treated tree are with a soil drill with a diameter of 5 to 25 cm (usually 15 cm) drilled one or more holes equal depth as the height of the bag. In such drilled hole the bag with tied aperture is downwards placed so that the bottom of the bag remains visible and at the level of the surrounding soil in contact with the atmosphere. This is to allow gas exchanges in the hole with the bag.

The composition which is the object of this invention and its application process are characterised by, besides the characteristic already disclosed in patent PK20140358, the following characteristic:
- through the root system allows the controlled input of insecticides into the plant, wherein the time at which the insecticide will be released into the soil and how long the release will take is specified, in quantities that the root system can absorb
- through the root system allows the controlled input of acaricides into the plant, wherein the time at which the acaricides will be released into the soil and how long the release will take is specified, in quantities that the root system can absorb
- through the root system allows the controlled input of fungicides into the plant, wherein the time at which the fungicides will be released into the soil and how long the release will take is specified, in quantities that the root system can absorb
- through the root system allows the controlled input of pheromones into the plant, wherein the time at which the pheromone will be released into the soil and how long the release will take is specified, in quantities that the root system can absorb
- through the root system allows the controlled input of repellents into the plant, wherein the time at which the repellent will be released into the soil and how long the release will take is specified, in quantities that the root system can absorb
- through the root system allows the controlled input of microelements into the plant, wherein the time at which the microelements will be released into the soil and how long the release will take is specified, in quantities that the root system can absorb
- through root system controlled input of nematodes that can confront the appearance of pests is allowed.
- through the root system allows for the controlled input of nutrients into the plant, wherein the time at which the nutrient will be released into the soil and how long the release will take is specified, in quantities that the root system can absorb
- through the root system allows the controlled input of nitrogen into the plant, wherein the time at which the nitrogen will be released into the soil and how long the release will take is specified, in quantities that the root system can absorb.
- in a programmable way regulates the acidity of the soil in the immediate environment of the inputted biodegradable bag.
- reduces the environmental burden and reduces the consumption of the chemically active substance because it is given as much active substance to the plant as it can absorb through the newly formed set of young roots at the point of input of the biodegradable bag.

The process of using the composition is such that said composition is packed in cylindrical biodegradable bags. A biodegradable ribbon binds the filling hole and then such bag filled with the composition, which is the object of this invention, is buried in the ground vertically with the bound part downwards, while the upper part remains at ground level in contact with the atmosphere without being covered with soil. When it rains, the water soaks up the bag and its content and extrudes all old and used air from it. As the soil absorbs water, the water is withdrawn from the bag, fresh air from its surroundings is replacing it, what makes that the plant's root system is always drained and well supplied with oxygen. The composition in the biodegradable bag is buried in the soil within a radius of treetop or wider. As nutrients slowly come in to the soil from the biodegradable bag containing the composition, the root of the plant senses them and begins to grow toward them. With plenty of phosphorus, the root expands, strengthens, and comes deeply into the surrounding soil. As the root system develops, i.e. a new "mouth" of the plant is formed through which a chemically active substance such as insecticides, fungicides, pheromones, repellents, and nematodes can be applied. Since an RFID identifier or a metal ring is inserted into the biodegradable bag, it is very easy, with the appropriate detector, to determine the location of the place where the biodegradable bag was. After having been given sufficient time a new amount of the active component in the form of nanocapsules or nanogels (or in any other form that allows smart release of the active substance) can be applied to the location depending on the requirements and needs for the adequate plant composition or the need for treatment of the plant.

Namely, once the root of the plant is able to take the active chemical substances quickly and efficiently, the fight against harmful insects and plant diseases is fast and effective. It is also important, that with the application through the roots, spraying insecticides and other pesticides through air becomes unnecessary, which is good, because spraying does endanger other useful insect species, for e.g. bees or predators of harmful insects (ladybugs, parasite wasps etc.).

Tests conducted by the inventor show that by slow nutrient release from the granules and capsules, the fertilizer efficiency increases on average by 200%, while the insecticide and fungicide application efficiency by nanoencapsulation increased by 300%.

DETAILED DESCRIPTION OF THE INVENTION

The active component is previously prepared, in the case that is insecticide, such as flonicamide, which is coated with membrane in required size by the method of nanoencapsulation or microencapsulation. For the use of nanoencapsulation are, most commonly, used polymers that have the advantage of comprising a large number of biocompatible and biodegradable molecules, including many suitable for the construction of different types of nanostructures that can be filled with the active substance (insecticide, fungicide, acaracid, pheromone or repellent). That also allows designing the capsules that contain molecules of a very different nature, size and water solubility. Also allows control over their release and concentration at relevant levels that allow effective action against plant pests or plant diseases. Also, the instrument for fertilization—fertilizer is closed by the nanoencapsulation method. Depending on the activation time, and that is in reaction with water, the wall thickness of the nanocapsules is determined, so that capsules with different wall thicknesses are produced, allowing the activation of the nanocapsules and the release of the active substance to be distributed over a period of 1 week to 8 weeks considering that the release dynamics in another performance can be resolved at different time intervals.

The obtained nanocapsules are placed in a neutral gel, in a way that with the obtained nano-gel can be more easily handled and it can be placed in certain mixtures, although the said nanogel can be used alone.

It is possible to use all five active components in one performance, each in separate capsules, namely: insecticide, fungicide, acaricide, pheromone and repellent. With those combinations, it is very important that the active components of each agent do not affect each other. In one performance, the time of activation of the active component, namely, leakage of the active component from the nanocapsule can be conditioned by the influence of water or scales, or by the action of air or citric acid or some other active substance which affects the membrane of the nanocapsule.

The preparation of the composition itself is performed in a way that following components to produce 100 kilograms of the composition are placed in the blender suitable for mixing:

expanded volcanic sand—perlite, of granulation to 5 mm is put in amount of 16.00 kg
  white peat is put in amount of 43.00 kg
  stable dung processed using red California earthworms is put in amount of 15.00 kg
  dehydrated horse dung is put in amount of 8.00 kg
  ground natural volcanoes zeolite mineral with granulation up to 5 mm is put in amount of 15.00 kg
  slow release mineral fertilizers with magnesium oxide and microelements is put in amount of 1.50 kg
  mineral complex fertilizer based on nitrogen, phosphorus and potassium is put in amount of 1.50 kg In the blender, the composition is blended for about 5 to 10 minutes. Such composition—the substrate is filled to the very tops of biodegradable bag made of jute, then the nanogel respectively active component in the nanocapsules is placed on top of the bag and everything closes from above with a jute binder. The nanogel can be put in these bags during placing the bag into the soil. The biodegradable bag is usually sewn from jute fabric with dimensions 40 cm in length and with 14 cm diameter of the aperture. Into the biodegradable bag fits 6.0 liters of substrate or about 3.50 kg of substrate in the dry state. The amount of added nanogel with the active substances depends on the prescribed dose of the active component, for e.g. that can be 10 grams of fungicide. Of course, if nitrogen in the nanocapsules is added, the amounts can be significantly higher, especially if the nanocapsules composition is such that it generates an extremely long release time, for e.g. 4 months or more. The combination of nanocapsules with nitrogen can be such that half of them release nitrogen during the first year of application of the composition and the other half of the nanocapsules release nitrogen in the second year of application, what significantly saves the costs of plant nutrition. Then the jute bag is packed in a PVC bag, which are on a best way vacuum-packed, labelled, stacked on pallets, bound with protective foil, and ready for transport. In another performance of the invention, the biodegradable bag can be made of biodegradable geotextile.

In case this composition is used for planting new seedlings, first has to be excavated a plant pit with dimensions from 40×40×40 cm to 100×100×100 cm, depending on the type and size of the seedling of the tree. For planting shrubs, has to be excavated a plant pit with dimensions from 40×40×40 cm to 60×60×60 cm, and for planting trees dimensions from 60×60×60 cm to 100×100×100 cm. For planting scrubs are one to four biodegradable bags used, and for planting trees two to eight biodegradable bags. In the case of planting a tree in extremely poor, compacted soil, it is recommended, with the aforementioned two biodegradable bags, to place up to a total of 8 bags in a wider radius in the plant pit to encourage the root to spread in this unfavourable soil. The bag is placed in a plant pit approximately 20 cm from the bale of a seedling, shrub or tree root respectively root system. The biodegradable bag is placed vertically, if it is a deeper planting pit, such as for trees or larger shrubs, in the upper part of the excavation facing down (binding spot facing downwards), in level with the ground, not covering with the soil because it must remain in constant contact with the air. The planting pit is covered with the rest of the earth from excavation or if it is about poor, low quality soil, it is advisable to replace the soil and add loose soil, with sandy structures. The earth around the bag and bale has to be pressed.

In case this composition is used for biological rehabilitation and protection of existing trees, shrubs, climbers, fruit trees, olives and vines with weak vital functions, first, it is necessary to test the locations and distribution of the existing root system with a metal rod, especially in the case of an older and larger tree with more branched root system. Then the location of the drilling on the peripheral (marginal) part of the root system, respectively the peripheral part of the tree top, if the aboveground part of the tree is viewed, is determined. It is necessary to drill two to eight holes, one opposite the other. The hole is usually drilled using a drill with dimensions 40 cm in length and 15 cm in diameter. The biodegradable bags used in such applications have implanted a RFID or metal ring so that they can be found later by one of the detection methods. Namely, after one to two years it is useful to determine the location of the hole and add new nutrients to the plant through it, as well as the active substances (insecticides, fungicides and pheromones, repellents, etc.), since this hole, because it represents source of nutrition for the plant, will be surrounded by newly developed root system. At this point the plant is going to, on a fastest way, absorb the active components through the root system and then the circulation of juices will lead to development of sprouts and leaves.

In one performance can slow-working mineral fertilizers be used, which have a prolonged effect such that their action lasts during most of vegetation time, or even longer. Such slow-working mineral fertilizers are obtained by the synthesis of various chemical compounds which contain nitrogen and are slowly degraded in the soil. These can also be granules of fertilizer coated with a layer of substance that does not allow fast nutrient transfer into the soil, respectively also nitrification inhibitors can be added.

The invention claimed is:

1. A product comprising a composition for fertilization and treatment of trees, shrubs, and climbing plants with programmed release of an active substance, wherein the composition contains the active substance disposed in nanocapsules or microcapsules having membranes that coat the active substance, wherein the time and duration of release of the active substance is controlled by the membranes of the nanocapsules or microcapsules, characterized in that the composition comprises:

expanded volcanic sand—perlite in the range of 2.00 to 3.00 mass percentage;

white peat in the range of 25.00 to 30.00 mass percentage;

stable dung processed by red Californian earthworms in the range of 15.00 to 20.00 mass percentage;

dehydrated horse dung in the range of 10.00 to 15.00 mass percentage;

ground natural volcano zeolite mineral in the range of 30.00 to 35.00 mass percentage;

slow-release mineral fertilizers with magnesium oxide and microelements in the range of 2.00 to 3.00 mass percentage;

mineral complex fertilizer based on nitrogen, phosphorus and potassium in the range of 2.00 to 3.00 mass percentage;

useful nematodes that increase resistance of trees, shrubs, and climbing plants to pests and diseases; and chemically active substance, which is present in the composition and present in an amount up to 1 mass percentage and is selected from the group consisting of a substance that regulates acidity of soil, insecticide, fungicide, acaricide, pheromone, and insect repellent;

wherein the composition is filled into one or more biodegradable bags that are closed at an upper end of the bags by a biodegradable material, wherein the composition filled into said one or more bags is the product.

2. The product of claim 1, wherein the active substance acidifies the surrounding soil in the range between pH 2.5 to pH 6.5.

3. The product of claim 2, wherein the active substance includes citric acid.

4. The product of claim 1, wherein the active substance regulates soil acidity in the range between pH 6.5 to pH 7.0.

5. The product of claim 1, wherein the active substance includes an insecticide, and the composition further includes second capsules that include one or more active substances selected from the group consisting of fungicide, acaricide, pheromone, and insect repellent.

6. The product of claim 1, wherein the active substance includes flonicamid.

7. The product of claim 1, wherein the bag includes an identification device disposed at an upper end of each bag to identify the location of the bag when the product is installed.

8. The product of claim 7, wherein the identification device is an RFID transmitter.

9. The product of claim 7, wherein the identification device is a metal ring.

10. The product of claim 1, wherein the composition further includes slow-working mineral fertilizers that contain nitrogen and are slowly degraded in the soil.

11. A method of fertilizing and treating a tree, shrub or climbing plant, comprising:

providing the product of claim 1 by packing said composition in said biodegradable bags to provide the product; and placing the product vertically near roots of a tree, shrub, or climbing plant into previously made holes in the soil so that the upper end of the biodegradable bags is at a position level with the terrain.

12. The method of claim 11, wherein a location proximate of the upper end of the biodegradable bag is covered with mulch.

13. The method of claim 11, wherein a tree, shrub, or climbing plant is planted on the edge of a plant pit and the product is placed vertically so that the upper end of the biodegradable bag is level with the terrain.

14. The method of claim 11, wherein, at the place of incorporation of the biodegradable bag a ball shaped clump of young roots with high absorption power is formed.

* * * * *